(12) United States Patent
Acker

(10) Patent No.: US 10,914,573 B2
(45) Date of Patent: Feb. 9, 2021

(54) SHEAROGRAPHY DETECTION AND CLASSIFICATION

(71) Applicant: BAE Systems Information and Electronic Systems Integration Inc., Nashua, NH (US)

(72) Inventor: Andrew N. Acker, Honolulu, HI (US)

(73) Assignee: BAE Systems Information Electronic Systems Integration Inc., Nashua, NH (US)

(*) Notice: Subject to any disclaimer, the term of this patent is extended or adjusted under 35 U.S.C. 154(b) by 126 days.

(21) Appl. No.: 16/424,669

(22) Filed: May 29, 2019

(65) Prior Publication Data
US 2020/0378751 A1 Dec. 3, 2020

(51) Int. Cl.
*G06K 9/00* (2006.01)
*G01B 11/16* (2006.01)
*G06N 3/04* (2006.01)
*G06K 9/62* (2006.01)

(52) U.S. Cl.
CPC ........ *G01B 11/162* (2013.01); *G06K 9/00201* (2013.01); *G06K 9/627* (2013.01); *G06K 9/6269* (2013.01); *G06N 3/0418* (2013.01)

(58) Field of Classification Search
None
See application file for complete search history.

(56) References Cited

U.S. PATENT DOCUMENTS

| | | | | |
|---|---|---|---|---|
| 5,004,345 | A * | 4/1991 | Hung | G01B 11/162 356/35.5 |
| 7,538,891 | B1 * | 5/2009 | Mello | G01B 11/2441 356/35.5 |
| 9,476,700 | B2 | 10/2016 | DeWeert et al. | |
| 9,671,521 | B2 | 6/2017 | Louchard | |
| 9,818,181 | B1 * | 11/2017 | Acker | G01B 9/02096 |
| 2013/0114088 | A1 * | 5/2013 | Newman | G01M 5/0058 356/520 |
| 2015/0338208 | A1 * | 11/2015 | DeWeert | G01V 1/226 356/520 |
| 2016/0209205 | A1 * | 7/2016 | Enevoldsen | G06T 11/206 |
| 2016/0282227 | A1 * | 9/2016 | Shen | G01M 17/025 |
| 2018/0372654 | A1 * | 12/2018 | Safai | G01N 21/956 |

OTHER PUBLICATIONS

Fröhlich et al ("Defect classification in shearography images using convolutional neural networks", Federal University of Santa Catarina, UFSC, Florianópolis, Brazil, 2018) (Year: 2018).*

* cited by examiner

*Primary Examiner* — Shervin K Nakhjavan
(74) *Attorney, Agent, or Firm* — Sand, Sebolt & Wernow LPA

(57) ABSTRACT

A system for classifying objects detected in shearographic images identifying via a derivative peaks method, process, or algorithm is accomplished with a CNN (CNN). The system utilized training techniques of the CNN to classify objects as threats or non-threats. The system utilizes extracted clips from the shearographic image that contain the presence of an object so that the extracted clip containing the object is/are evaluated by the CNN to classify the object on or below a surface that has been insonified or otherwise stimulated to generate the shearographic image.

20 Claims, 9 Drawing Sheets

SHEAROGRAPHY DETECTION AND CLASSIFICATION

STATEMENT OF GOVERNMENT INTEREST

This invention was made with government support under Contract No. N00014-16-C-3039 awarded by the U.S. Navy. The government has certain rights in the invention.

TECHNICAL FIELD

The present disclosure relates generation to subterranean or buried object detection and classification. More particularly, the present disclosure detects the presence of an object from a shearogram or shearographic image and classifies the detected object through the use of deep learning.

BACKGROUND

The state of the art discloses various means for detecting buried objects, for instance, non-phase resolved (NPR) shearography, phase resolved (PR) shearography, and laser Doppler vibrometry. In NPR shearography, a target surface, part or area being observed is typically illuminated by an expanding laser beam, and two time sequential images (namely, specklegrams; two images for NPR shearography, and four time sequential images for PR shearography) are captured of the target surface, part or area with an image-shearing camera. The first image is taken of the surface, and the second image is taken of the same surface a short time thereafter during deformation or loading of the surface. The two specklegram images taken are processed together to produce a third image (a shearogram) showing a fringe pattern that depicts the gradient of the displacement of the surface due to some loading of the surface between the first and second images.

More particularly, shearography is an optical measuring technique using coherent light for the interferometric observation of the surfaces typically under non-destructive thermal or mechanical loading to distinguish between structural information and anomalies of the surfaces or parts due to loading such as thermal or mechanical loading. The two images are each laterally displaced images taken of the surface of the part being observed and the two images are coherently superposed. The lateral displacement is called the shear of the images. The superposition of the two images is called a shearogram, which is an interferogram of an object wave with the sheared surface wave as a reference wave.

The absolute difference of two shearograms recorded at different physical loading conditions of the target surface, part or area is an interference fringe pattern which is directly correlated to the difference in the deformation state of the target area between taking the two images thereof. In contrast to holographic interferometry, the fringe pattern indicates the slope of deformation rather than the deformation itself. Defects inside the target part will affect the local surface deformation induced by the loading and result in a disturbance of the loading fringes that are detected.

The resultant difference images exhibit a very noisy structure. This is due to what are called speckles. Speckles are statistical interference patterns which occur after reflection of a coherent wave off a rough surface, giving the image a grainy structure. Regarding shearography, the speckles are the carrier of information, coding the wave field and surface state information respectively and giving rise to interference fringe patterns. However, the grainy nature of the speckles is conserved and significantly decreases contrast and signal to noise ratio (SNR) of the difference images.

The difference images typically exhibit strong noise and low contrast that require further image processing. This further image processing can be either image improvement or image evaluation. Stated otherwise, shearographic imagery may sometimes have low SNR. Low SNR levels make it difficult to process information from the Shearographic imagery. Particularly, it can be difficult to process, evaluate, and classify shearograms at low SNR.

SUMMARY

A need continues to exist for a technique for classifying features within shearograms (such as a buried object) after they have been detected. The present disclosure according to one embodiment uses a derivative peaks process or algorithm as a first stage cuing process or algorithm and the system then employs a second stage deep learning process or algorithm, such as CNN, to classify the detection hypothesis as either clutter (non-threats) or targets (or threats). The methodology of the present disclosure can detect both high amplitude and low amplitude shearograms with the same setting. Further, the methodology of the present disclosure learns from training data and therefore does not require detailed manual fine tuning, and can learn to accommodate new clutter types.

In one aspect, an exemplary embodiment of the present disclosure may provide a shearography system comprising: a device to stimulate a target surface; a sensor to sense the target surface; an image generator to generate a shearographic image based on data from the sensor; logic to determine a derivative peak value of the shearographic image to detect the presence of an object below the target surface at a location in the shearographic image; and a CNN to classify the object below the target surface at the location corresponding to the derivative peak value. This exemplary embodiment or another exemplary embodiment may further provide an extracted clip from the shearographic image encompassing the derivative peak value, wherein the extracted clip is provided to the CNN. This exemplary embodiment or another exemplary embodiment may further provide wherein the extracted clip includes features of the object that is to be classified by the CNN. This exemplary embodiment or another exemplary embodiment may further provide wherein remaining portions of the shearographic image, after the extracted clip has been extracted, contains background matter that is not classified by the CNN. This exemplary embodiment or another exemplary embodiment may further provide the ability to operate the derivative peaks algorithm at lower thresholds thereby permitting the detection of weaker or only partially imaged targets. This exemplary embodiment or another exemplary embodiment may further provide a detection call from the CNN classifying one of: (i) a target and (ii) clutter of the object that is identified by the derivative peak value and based on previous training and machine learning of the CNN. This exemplary embodiment or another exemplary embodiment may further provide a four-class classifier in the CNN constructed from an inception network. This exemplary embodiment or another exemplary embodiment may further provide classes in the CNN, wherein every class in the CNN is occupied by a target type or clutter type defined during CNN training, or where two or more class classifier in the CNN constructed from any pre-trained image identification CNN network. This exemplary embodiment or another exemplary embodiment may further provide object features identified by derivative peaks of values in the shearographic image, wherein the shearographic image is Gaussian filtered.

In another aspect, an exemplary embodiment of the present disclosure may provide a method comprising: stimulating a surface; sensing the surface during stimulation; generating a shearographic image based on data sensed during stimulation of the surface; detecting an object present on or below the surface at a location in the shearographic image via a derivative peak value analysis; and classifying the object with a CNN at the location in the shearographic image corresponding to the derivative peak value. This exemplary method or another exemplary method may further provide extracting a clip from the shearographic image encompassing the derivative peak value; and providing the clip that has been extracted to the CNN. This exemplary method or another exemplary method may further provide wherein the extracted clip includes features of the object that is to be classified by the CNN. This exemplary method or another exemplary method may further provide wherein remaining portions of the shearography image after the extracted clip has been extracted contains background matter that is not classified by the CNN. This exemplary method or another exemplary method may further provide lowering a threshold value associated with the derivative peak values when the extracted clip is a partial image of the object beneath the target surface. This exemplary method or another exemplary method may further provide executing a detection call of from the CNN to classify the object identified by the derivative peak value as either target or clutter based on previous training of the CNN. This exemplary method or another exemplary method may further provide constructing four-class classifier in the CNN from an inception network. This exemplary method or another exemplary method may further provide eliminating any empty classes in the CNN. This exemplary method or another exemplary method may further provide occupying every class in the CNN. This exemplary method or another exemplary method may further provide Gaussian filtering the shearographic image; and classifying object features based on derivative peaks of values in the shearographic image after Gaussian filtering.

In yet another aspect, an exemplary embodiment of the present disclosure may provide a system for classifying objects detected in shearographic images identified via a derivative peaks method, process, or algorithm is accomplished with a CNN. The system utilized training techniques of the CNN to classify objects as threats or non-threats. The system utilizes extracted clips from the shearographic image that contain the presence of an object so that the extracted clip containing the object is/are evaluated by the CNN to classify the object on or below a surface that has been insonified or otherwise stimulated to generate the shearographic image.

In one particular example, the derivative peaks approach looks for features in the shearographic image by moving or evolving a template over the image. Within the template, there are a plurality of lines or cross-sections drawn therethrough. At different reference points in the image, the cross-sections are evaluated relative to that respective point. From those cross-sections a composite numerical derivative is calculated, at that respective point; structure within the images results in peaks in the composite derivative value. The derivative peaks approach is performed so that at each point in the image and a value is tabulated relative to a set threshold. If the number of peaks at a respective point are above the threshold, then a hotspot is mapped for that image. As the template moves over the entire image, there are regions where there are collections of hotspots or hot points. Effectively, these regions are where there is a large or significant number of local peaks that indicate there is some feature within the image. Essentially, the derivative peaks approach identifies features within the shearogram to act as a first stage detector that indicates there is an area of interest that could be a target object. The present disclosure adds a second order determination beyond this first stage evaluation to determine if the identified object of interest is a target or object that the system is looking for or if it is a clutter object. With respect to the present disclosure, the shearogram is generated in response to insonifying the ground and then imaging the ground with a laser interferometer system. The laser system will detect some resonance of the ground surface, which results in a resonance pattern within the shearogram, wherein the detailed structure depends on the object beneath the surface. The CNN of the present disclosure provides a second order evaluation that is performed after the derivative peak process is implemented. The second order evaluation occurs after receiving the indication from the derivative peaks approach that there is a target or a feature that needs to be evaluated. In one particular embodiment, the CNN acts as a type of classifier, however, other types of classifiers are entirely possible. The classifier, which in one particular embodiment, is the CNN, receives the output of the derivative peaks approach or algorithm that has identified a point of interest on the shearographic image. Then the region surrounding this point is extracted to form an image clip and the image clip is provided to the classifier which evaluates the image clip and returns a class name. In one particular example, the class name may be a target or a non-target, such as clutter. The class names can be any classes that have been used to train the classifier. After the CNN has been trained, it is advantageous to use as a classifier inasmuch as it does not need a mathematical definition of exactly what a target looks like. Effectively for shearography, most targets are fairly amorphous and they could take on different shapes at different times. Typically, a human will be able to recognize them, however it is difficult to classify certain targets with a strict mathematical definition. Thus, a trained neural network is extremely practical for real world applications. In some implementations, a filter may be applied to the output of the CNN such that only a threat that was classified is provided to the human operator or user. This can be done in real time so that the system may take action in response to the notification or alarm of the threat. In one example, there may be a rover or vehicle that senses a target threat that sends a command for the rover or vehicle to stop at which point a robot can proceed towards the target in order to detonate or clear the target from beneath the ground surface. When the shearography system is applied to an airborne vehicle, it may be mounted on a helicopter that may fly approximately 250 feet above the ground surface. Alternatively, it could be applied to a UAV or drone that is flying at lower altitudes such as 30 to 50 feet above a ground surface.

Regarding the training of the CNN, there are multiple ways to perform the same. One particular example, the CNN is trained by providing it with test data where the human operator or user has identified various targets and other clutter objects or background noise. The human operator or user or developer that looks at the results and classifies them as whatever object class they are and uses that for training. Further, in actual operation there may be a plurality of classes that the object could be ranked within. Thus, if there are more than one classes to which the classifier may believe the located target is a member, then they may provide a class ranking such as the top 2, 3, or 4 classes depending on the sensitivity or threshold level of the class ranking to which the detected object might be a member.

In yet another aspect, an exemplary embodiment of the present disclosure may provide a computer program product including one or more non-transitory machine-readable mediums encoded with instructions that when executed by one or more processors cause a process to be carried out for detection and classification of a shearographic image, the process comprising: providing at least two images of a target surface, wherein at least one of the images includes stimulation of the target surface; generating the shearographic image based on the images; detecting an object below the target surface from the shearographic image via a derivative peak process; and classifying the object with a convolutional neural network (CNN) at a location in the shearographic image corresponding to the derivative peak value

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
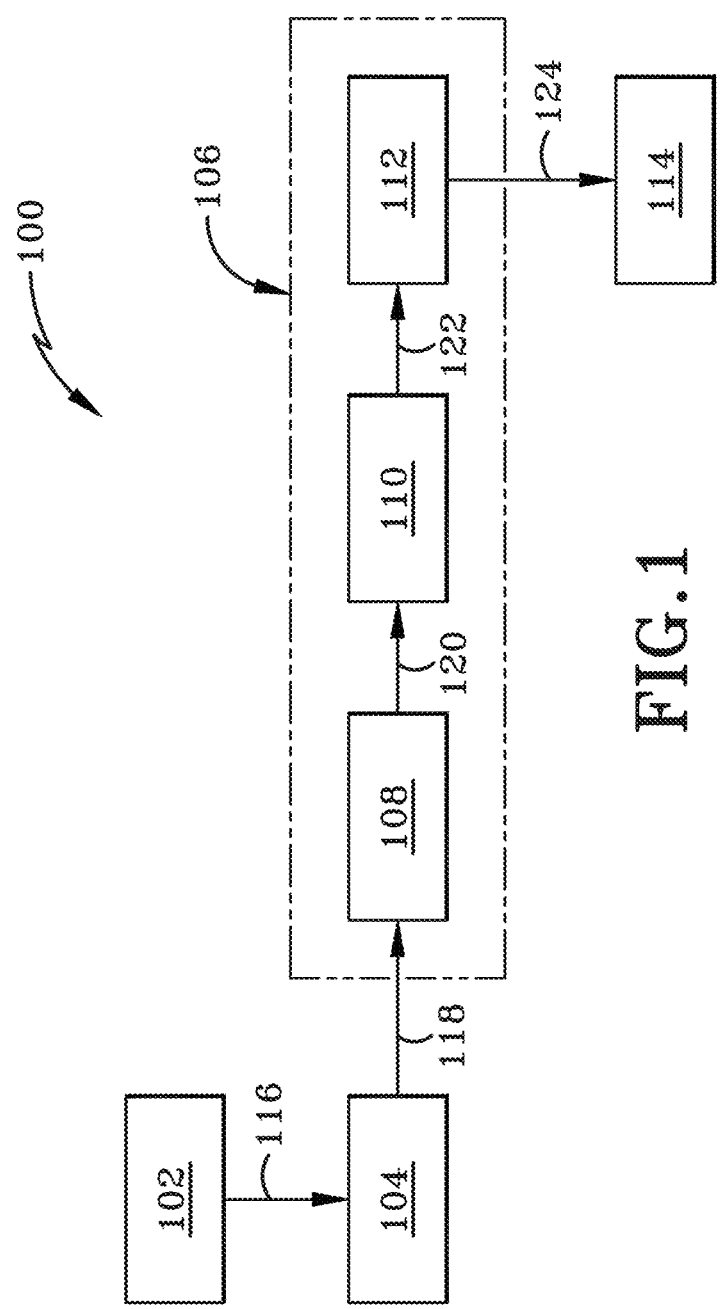
FIG. 1 is a schematic view of a shearography system in accordance with one embodiment of the present disclosure.

FIG. 1 depicts a system for identifying and/or classifying objects including in one example threats from other non-threats in a shearography system generally at 100. The system 100 includes sensor data 102, a shearogram or shearographic image generator 104, and object detector 106 (which may also be considered object detection logic) having derivative peaks logic 108, clip extraction logic 110, and a deep learning process such as CNN 112. The object detector 106 generates an execution or detection call 114 to identify/detect and classify an object or anomalies such as the underground objects 22 (FIG. 2) and beneath a target surface such as underground 15 (FIG. 2).

Figure 2:
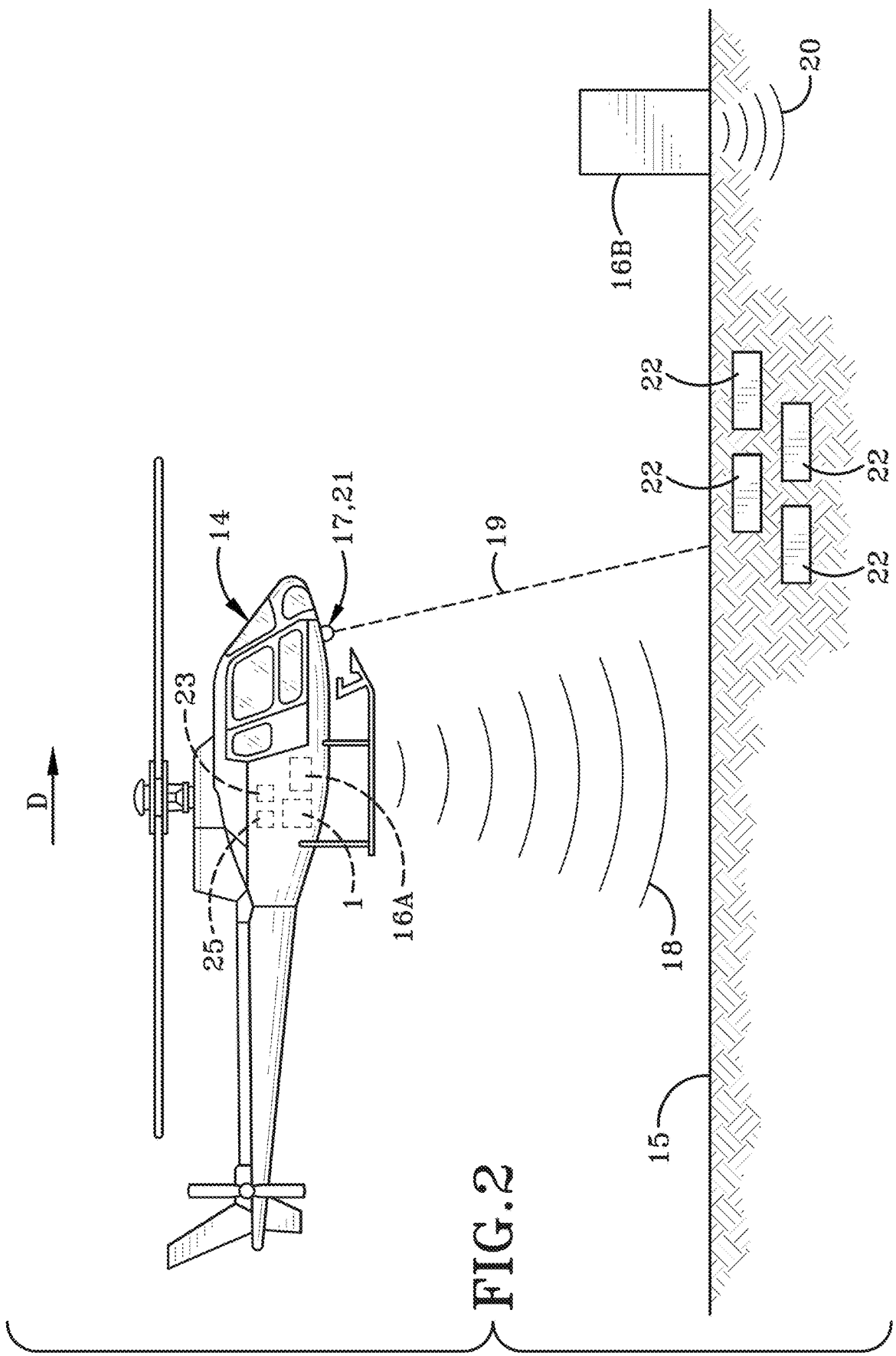
FIG. 2 is a diagrammatic view of some portions of the shearography system according to one example.

Sensor data 102 from system 100 is gathered in a manner described herein and in one example with respect to FIG. 2. Namely, the sensor data 102 is generated from shearography equipment or apparatus 1 (FIG. 2). The sensor data 102 is coupled to the shearogram or shearographic image generator 104 via link 116, which may be any wired or wireless communication channel or transmission mechanism to effectuate the transfer of the sensor data 102 to the shearogram or shearographic image generator 104. As will be detailed below in FIG. 3, the shearogram or shearographic image generator 104 generates a shearogram. The shearogram or shearographic image generator 104 is coupled to the detector 106 via link 118, which may be any wired or wireless communication channel or transmission mechanism to effectuate the transfer of the shearogram or the shearographic image to the detector 106. In one particular embodiment, the generator 104 is coupled with the derivative peaks logic 108 via link 118. As will be described herein such as in FIG. 4-FIG. 5, derivative peak logic 108 is configured to detect or identify anomalies or objects 22 below the surface 15 through the use of localized surface patterns. Derivative peak logic 108 detects or identifies objects 22 and is coupled with the clip extraction logic 110 via link 120, which may be any wired or wireless communication channel or transmission mechanism to effectuate the transfer of the identifies objects in the shearogram to the extraction logic 110. The clip extraction logic extracts clips from the shearogram or shearographic image of the portions of the image that include the object(s) 22. The clip extraction performed by the clip extraction logic is accomplished by the derivatives peaks component identifies the center pixel coordinate of the of an anomaly in the deprogram image. The image clip (whose size in pixels is specified in the algorithm input parameters) is extracted where the center pixel of the image clip is the same as the center pixel coordinate identified be the derivatives peaks component. In the case where the center pixel coordinate identified by the derivatives peaks component is near the shearogram image edge the center pixel of the extracted image clip is shifted such that it is as close to the center pixel identified be the derivatives peaks component as possible, while keeping the image clip from extending past the shearogram edge. The clip extraction logic 110 is coupled to the CNN 112 via link 122, which may be any wired or wireless communication channel or transmission mechanism to effectuate the transfer of the extracted shearogram clips to the CNN 112. The CNN 112 is configured evaluate the extracted clips and classify the detected object 22 based on previously trained machine learning techniques.

In one embodiment, the CNN 112 classifies the object(s) 22 as a threat or a non-threat. In another embodiment, the CNN 112 classifies the object by a descriptor. For example, rather than simply classifying the object 22 is a non-threat, the CNN can use a descriptor such as buried cable, sewer line, trash/garbage/refuse, or any other non-threat descriptor. Similar, the CNN may go beyond identifying the object 22 as a threat, by using a descriptor that indicates that the buried object 22 is a mine, improvised explosive device (IED), or other ordinance configured to inflict harm. CNN 112 is coupled with the detection call 114 via link 124 which may be any wired or wireless communication channel or transmission mechanism to effectuate the transfer of the object classification (i.e., threat or non-threat) to the detection call 114. The detection call 114 may then implement operations to use the classified object 22 or be used by other operations to use the classified object 22 to accomplish a further mission objective. For a non-threat, the detection call 114 may result in a no-action detection call 114 in which the operator of the system does nothing a leaves the object 22 alone beneath the surface. Alternatively, for a threat, the detection call 114 may result in an action item or task for the operator to remove the threat.

It is to be entirely understood that system 100 of the present disclosure can be alternatively expanded to commercial applications. In one particular embodiment, the system 100 does not need to be identifying threats from non-threats but rather simply trying to classify objects below the target surface 15. For example, any subterranean object detection and classification system could take advantage of CNN that classifies objects detected via the derivative peaks method, process, or algorithm from a shearogram or shearographic image.

FIG. 2 is an illustrative example that depicts shearography equipment or apparatus 1 may be mounted on a moving platform 14, which may include powered transport or vehicles such as aircraft, watercraft (surface craft or underwater craft), or land motor vehicles which may be manned or unmanned, whereby, for instance, an aircraft may be a manned/piloted aircraft or an unmanned aerial vehicle (UAV). Platform 14 may also be a handheld device which may move simply as a result of being carried by a person who is moving (under his or her own power or via a powered vehicle) or by being carried by one of the other moving platforms noted above. For purposes of example, moving platform 14 is shown as a helicopter, which however represents any suitable moving platform which may carry equipment 1 whereby equipment 1 moves with platform 14 relative to a target or target surface 15 during operation of equipment 1. This movement of platform 14 and apparatus/equipment 1 is shown at Arrow D in FIG. 2, which also represents the forward direction of movement or flight of platform 14. The movement of platform 14 and apparatus/equipment 1 during the emission of laser beams and collection of specklegrams is typically generally parallel to the target surface or ground.

A target excitation device 16 may be provided in various forms to non-destructively deform or load target 15. Device 16 may be an onboard excitation device 16A mounted on moving platform 14 or may be a separate excitation device 16B which is separate from or not on moving platform 14. Device 16A may be, for instance, a sound driver, transducer or acoustic source or speaker capable of producing or emitting sound waves 18, for example, a relatively high power, low frequency sound wave which is directed from moving platform 14/apparatus 1 toward the ground or other target surface 15 to vibrate (deform or load) the ground or other target 15. In another example, a separate device 16B may be, for example, a seismic thumper which may be in the form of a thumper truck, which may also be known as a vibroseis truck or vibe truck. A seismic thumper may impact or be directed toward the ground or other target to likewise vibrate (deform or load) the ground or other target surface 15, as illustrated by waves or vibrations 20. In this example, the use of shearography equipment 1 allows for the discernment of underground anomalies 22 such as underground ordnance or landmines (including improvised explosive devices or IED) or other subsurface or underground objects or structures such as rooms, tunnels, pipes and so forth. Thus, anomalies below surface 15 may be referred to as objects 22.

In the basic operation of shearography apparatus 1, one of the one or more laser transmitters 17 (which generally may be referred to as a "device" or "devices" in the appended claims) transmits, emits or shoots a laser beam 19 which impacts a target surface or target surface 15 and is reflected from surface 15 as a reflected laser beam image back to portion of apparatus 1 into beam splitter onto mirrors and into a camera 21 that captures the reflected image in two copies which are laterally displaced (sheared image copies) and combined to form a specklegram. The reflected laser beam images and specklegrams are collected and stored or saved in a memory 23 of a CPU 25, which includes a computer program of the shearography system which is configured to process the specklegrams to produce a shearogram from which can be discerned surface changes of target surface 15 and corresponding subsurface structures or movements. The computer program run by the CPU 25 is configured to calculate the various relevant aspects in order to effect the methods discussed herein.

One shearography method includes reflecting sequentially off of a target surface (such as 15) at least three laser beams when the target surface is respectively under different loads (and different surface states) to produce respective reflected laser beam images. This method may then include the steps of phase stepping the reflected laser beam images with a shearing interferometer, collecting specklegrams of the target surface based respectively on the reflected laser beam images, and comparing the specklegrams to one another to create or produce a shearogram to ascertain surface changes of the target surface. The shearing interferometer of shearography equipment 1 is configured with a stepping mirror or another phase shifting or phase stepping optical element to phase shift or phase step the reflected laser beams images. Typically, three or four laser beam emissions or shots are used to respectively produce three or four reflected laser beam images, which in turn are used to respectively produce three or four specklegrams. It is noted that for a given set of the laser beams (e.g., three or four) used to derive a given specklegram, the laser beam wavelength of each laser beam is the same for that given set. A set of three specklegrams may be processed or compared to one another to produce a given shearogram or a set of four specklegrams may be processed or compared to one another to produce a given shearogram. This process may be repeated as many times as desired to produce as many shearograms as desired over time.

Thus, for instance, a first shearogram may provide information indicative of surface changes (such as surface relief changes) of the target surface at a given time (when a given/first set of laser beams used to create a specklegram are reflected off of the target surface); a second shearogram may provide information indicative of surface changes of the target surface at a subsequent given time (when a given/second subsequent set of laser beams used to create a specklegram are reflected off of the target surface); a third shearogram may provide information indicative of surface changes of the target surface at a subsequent given time (when a given/third subsequent set of laser beams used to create a specklegram are reflected off of the target surface); and so forth. The first, second, third etc shearograms thus provide surface change information at time intervals so that the observer of the shearograms can discern surface changes of the target surface over time, which may even occur in a movie format in essentially real time. Various aspects of the method or methods at issue are discussed in greater detail hereafter.

When onboard excitation device 16A is a sound driver, device 16A is operated to insonify target area 15, thereby deforming or loading target 15. Similar to laser 2, the device 16A may also be considered the "device" or one of the "devices" in the appended claims. Separate device 16B may also be used. In either case, the target surface 15 is deformed or loaded. It is noted that other sources (e.g., ambient excitations) of deformation or vibration may also be used to deform or load the target surface, wherein such sources are not controlled by the user or investigator. Thus, for instance, any natural source of vibration may be used as an excitation providing a given load on the target surface. While surface 15 is thus deformed or loaded with a first load, one of laser transmitters transmits or shoots a first laser beam onto target area 15 such that the first laser beam is reflected and sheared and phase stepped/shifted via the shearing interferometer to produce an image which is captured by camera 10 and saved or stored. Very shortly (typically a few milliseconds) after producing the first load and after the first transmission of the laser beam, device may be operated to similarly deform or load target 15 with a second load which is different from the first load. While surface 15 is thus deformed or loaded with the second load, one of laser transmitters likewise transmits or shoots a second laser beam onto target surface 15 so that the second laser beam is likewise reflected and sheared and phase stepped via the interferometer to produce an image which is captured by camera and saved or stored. This process of loading target surface 15 with different loads and transmitting laser beams onto target surface 15 may occur multiple times at very brief time intervals (again, typically a few milliseconds between a given pair of loads and a given pair of laser shots). Thus, for instance, shortly after producing the second load and after the second laser beam transmission may load target surface 15 with a third load which is different from the first and second loads, so that while surface 15 is loaded with the third load, one of laser transmitters transmits onto target area 15 a third laser beam which is reflected and sheared and phase stepped via the interferometer to produce a third image captured by camera and saved or stored; and shortly after producing the third load and after the third laser beam transmission may load target 15 with a fourth load which is different from the first, second and third loads, so that while surface 15 is loaded with the fourth load, one of laser transmitters transmits onto target area 15 a fourth laser beam which is reflected and sheared and phase stepped via the interferometer to produce a fourth image captured by camera 10 and saved or stored. This process may continue although three or four laser shots and captured images are typically sufficient to produce a given shearogram with the desired information as to a certain target area of a given size. Nonetheless, this process may continue with respect to a larger target area in order to produce as many shearograms as needed to obtain the desired information. As noted or suggested above, the time between a given pair of laser shots and between a given pair of loads may be very short. The time between laser beam shots may be less than ½ the wavelength of an acoustic excitation or sound wave. While this may vary, in many cases, three, four or five laser beam shots may occur within five or ten milliseconds.

Further discussion of shearogram generation may be found in U.S. Pat. Nos. 9,818,181 and 9,476,700, which are both incorporated by reference as if fully rewritten herein.

Figure 3:
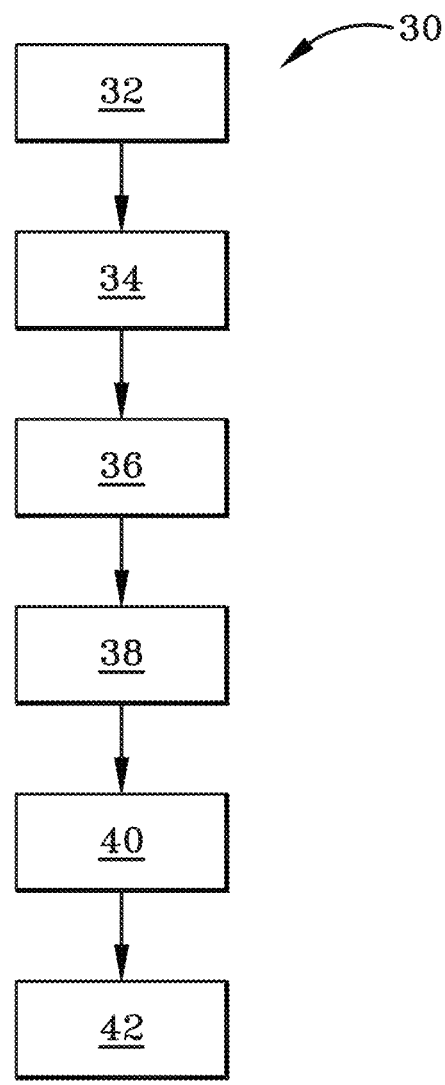
FIG. 3 is a flowchart depicting a method for generating a shearographic image in accordance with one embodiment.

FIG. 3 depicts a process or method 30 of a shearogram generation algorithm executed by shearogram or shearographic image generator 104 which includes several steps, such as providing a set or plurality of specklegrams or specklegram images from shearography equipment (block 32); inputting the set or plurality of specklegrams (block 34) (or providing as an input image the specklegram set) into or to a suitable computer program which is run on the computer or processing section of the system; filtering with a high pass filter and normalizing the input specklegrams (block 36); co-registering the input, filtered and normalized specklegrams (block 38); generating shearograms from the filtered and normalized specklegrams (block 40); and displaying the shearograms (block 42), such as on a monitor or display screen and/or using the shearograms to detect target surface changes/subsurface structures or movements.

Method, process, instructions or algorithm 30 typically takes inputs of a series of, for Phase Resolved (PR) shearography, at least four specklegrams or for Non Phase Resolved (NPR) shearography, at least two specklegrams collected from a moving platform. These specklegrams are co-registered such that the speckle patterns in each specklegram are aligned together or with one another. Co-registration may be accomplished by applying normalization and filtration by a high pass filter to the images. Then, a Fast Fourier Transform (FFT) process can be applied to locate the cross-correlation maximum. The high pass filtering process suppresses illumination variation across images and maximizes the high frequency speckle noise content of the imagery. The cross-correlation process determines the translational offset between pairs of filtered specklegrams. The translational offsets are used to co-reregister the specklegram set. Shearograms are then generated from the set of co-registered filtered specklegrams.

Input specklegrams are high-pass filtered (spatially filtered) and normalized to suppress low spatial frequency variation in the images so that filtered output high frequency speckle noise dominates in the resultant. The high pass normalization filter first applies a low pass filter by convolving the input specklegram image with a normalized filter kernel to produce a low pass filtered specklegram image. Either a rectangular (boxcar) filter kernel or a Gaussian filter kernel can be used for this operation. A filter kernel herein is an array of numbers or elements, and normalized filter kernel herein means that the sum of elements in the filter kernel is one. For instance, a 5×5 normalized boxcar filter kernel is a 5×5 array of elements, each with the value of 1/(5×5)=1/25. In practice, application of a normalized filter kernel to an image (convolving the filter kernel with the image) leaves the mean value of the image unchanged.

The low pass filtered image LP may be obtained by convolving the input image I with the low pass filter kernel K:

$$LP = I \otimes K$$

For a square boxcar filter kernel of dimension (2m+1), K can be written as $$K(2m+1) = \frac{1}{(2m+1)^2} M$$

Where M is a (2m+1)×(2m+1) matrix with $M_{i,j}=1$ for all matrix elements. For this case, the elements of the filtered image LP are given by $$LP(i, j) = \frac{1}{(2m+1)^2} \sum_{k=-m}^{k=m} \sum_{l=-m}^{l=m} I(i+k, j+l)$$

The effect of the low pass boxcar filtering operation is to replace I(i, j) by a local average computed in a (2m+1)×(2m+1) square region centered at pixel I(i, j).

The original input specklegram image is then divided by the low pass filtered specklegram image, producing a high pass filtered normalized specklegram image as an output. Particularly, the division process is applied on a pixel-bypixel basis, that is, if Output (i,j), Input (i,j), and LP (i,j) represents a pixel in the output image, input image, and low pass filtered image respectively, then Output (i,j)=Input (i,j)/LP (i,j). More particularly, the low pass filter kernel should be selected such that it is sufficiently large compared to a spot size (in pixel) produced by sensors or image shearing cameras, but smaller than the typical intensity variations across the image. For example, a sensor or image shearing camera with a spot size of order 1-pixel, a 21×21 pixel rectangular filter kennel (boxcar) is effective.

For shearographic systems, the nominal spot size generated by an image shearing camera with a diffraction limited lens is approximately 1 pixel as measured on the camera's focal plane. In a system using 532 nm laser light, the physical spot size on the focal plane is approximately $$\text{spot\_size} = (f/\#) \times 1.3\mu$$

In constructing a shearography system, a lens is typically chosen with an f-number (f/#) that produces a spot size about equal to one pixel on the focal plane (the pixel pitch), i.e., $$\frac{(f/\#) \times 1.3\mu}{\text{pixel-pitch}} \approx 1$$

For typical 1-pixel spot size systems, the filter kernel may be at least 11×11 pixels, i.e., m=5 in a (2m+1)×(2m+1) filter kernel. Intensity variations across the image may either be caused by illumination non-uniformity of the laser source or reflectivity variation across the scene. The actual scale of the intensity variation can change from scene to scene.

Figure 4:
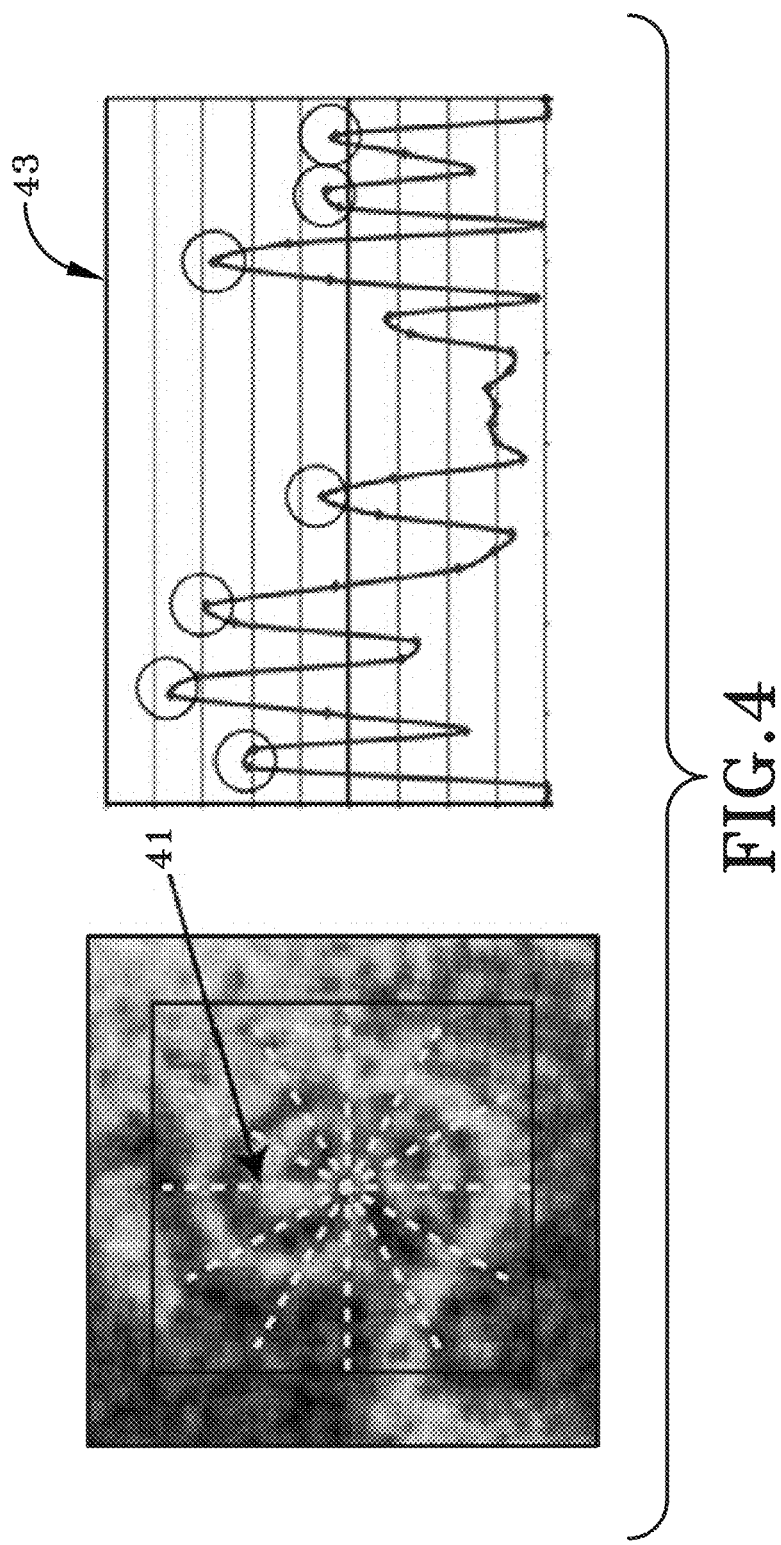
FIG. 4 is an image and corresponding and derivative peak vectorgraph for illustrative purposes.
Figure 5:
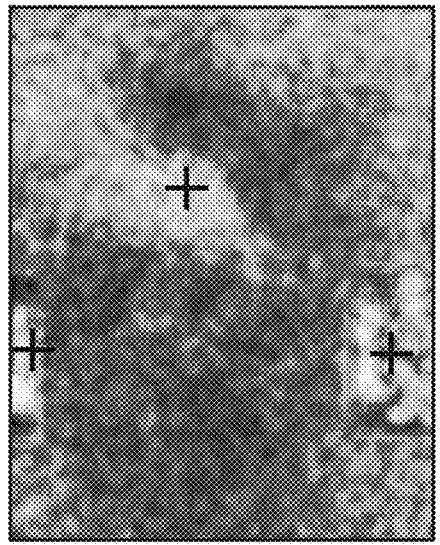
FIG. 5 is an exemplary shearographic image and corresponding derivative map for a single lobe pattern and a dual lobe pattern.

FIG. 4 and FIG. 5 depicts a derivative peak method, process, instructions or algorithm used in conjunction with the shearography images generated using the techniques referred to in FIG. 2 and FIG. 3. Parameters used in a derivative peak method algorithm are listed in the table below:

TABLE 1

| Variable | Type | Description |
| --- | --- | --- |
| Scalefactor | Integer | Used to downsample the image and increase processing speed. It is an integer, used to scale by 1/scalefactor |
| derivthresh | Integer | Minimum number of peaks in sum of all vector peaks. |
| fullkernel | Integer | Length of row and column vector, centered on the pixel under analysis. This is scaled by scalefactor to make the actual kernel size (Ksize) used in derivative calculations. |
| deriv_width | Integer | Number of pixels used in calculation of derivative, this is essentially a moving window size. |
| deriv_peakthresh | Floating Point | Minimum magnitude for derivative peak to be counted. |
| minpeak_range | Floating Point | Spacing range of rings of "butterfly pattern". This value requires some preliminary analysis of the data in order to be determined. It is scaled by the scalefactor variable. |
| maskvalue | Floating Point | Pixels in the original laser interferometer image above this value are set to zero in a mask image of ones. The mask is multiplied with the Derivative Map to mask out reflective surface clutter. |
| maskfraction | Floating point | Percentage of masked area allowed within radius of fullkernal. |
| grprad | Integer | Maximum spacing between cluster pixels. |
| minpix | Integer | Minimum number of pixels for a cluster in the derivative image. |

TABLE 1-continued

| Variable | Type | Description |
| --- | --- | --- |
| maxpix | Integer | Maximum number of pixels for a cluster in the derivative image. |

The first step of the method is to pre-process raw laser interferometer imagery using a Gaussian blur filter. The Gaussian kernel is created with variables for size and standard deviation. The equation below shows the form of a two-dimensional Gaussian:

$$g(x, y) = \frac{1}{2\pi\sigma^2} e^{-\frac{x^2+y^2}{2\sigma^2}}$$

where x and y are vectors with length equal to the kernel size (Ksize=(5, 5) for example). The vector values range from positive to negative (Ksize−1)/2, interpolated along the length of the vector. For Ksize=(5, 5) the x vector would be (−2−1 0 1 2) and the y vector would be the transposed vector (−2−1 0 1 2)'. When used in Matlab, these vectors are replicated into matrices for multiplication. Ksize should be odd to maintain symmetry in the calculation.

The Gaussian kernel is then filtered using following Equation:

$$g(x,y) < FPA \ast \max(g) = 0$$

where FPA is the floating point relative accuracy for the program being used, or the minimum distance between 1.0 and the next floating point number.

Note: MATLAB (MathWorks, Inc.) is a multi-paradigm numerical computing environment and fourth-generation programming language. MATLAB allows matrix manipulations, plotting of functions and data, implementation of algorithms, creation of user interfaces, and interfacing with programs written in other languages, including C, C++, Java, Fortran and Python. "MATLAB" is a registered trademark of Mathworks, Inc.

In Matlab, the function 'eps' gives the FPA value. Once the Gaussian kernel is produced, it is applied to each pixel in the image in a stepwise manner, shifting the kernel "window," then multiplying the matrix by the pixels that fit in the window.

A blur kernel must fit entirely in the image, so in order to apply it to pixels at the edge there must be a "padded" edge on the image equal to (Ksize/2−1). For example, a 5 by 5 kernel requires the image to have two pixels of padding on each side, so it ends up being four pixels larger. This padded image is temporary, and only used for processing the Gaussian blur image, which is the same size as the input image. Padding pixels will have the value of the nearest edge pixel of the original image.

The smoothed image can be downsampled by an amount equal to the inverse of the scalefactor parameter to help improve processing speed when analyzing multiple frames for mine detection. There are many types of interpolation algorithms for downsampling. The simplest algorithm samples each nth pixel, equal to the integer scalefactor, making it an efficient algorithm.

The derivative algorithm is applied in a way similar to a convolution, using a moving window that acts on each pixel of the image. An important difference is that calculations are only done along the N derivative vectors, where N is even. If N=2 then one vector can be taken along the row direction and the other in the column direction. In this case the first derivative is calculated along the row and column vectors using the below equation.

$$\frac{dI}{dp} = \frac{I(p_i) - I(p_j)}{p_j - p_i}$$

The spacing (dp) between two points along the vector (pj and pi) is an odd number (default spacing is 5 pixels) and pj>pi. Peaks in the absolute-value derivative spectrum are found by locating points that change from increasing to decreasing slope using the following rule: If dl/dp(i−1)+dl/dp(i+1)≥dl/dp(i)→peak in absolute derivative vector The magnitude of the peak (dl/dp value) is compared to a threshold peak value deriv_peakthresh (set to 0.2 in FIG. 4). The total number of peaks above deriv_peakthresh are summed together from the N derivative vectors and the value placed into a new image map called a "Derivative Map" in the coordinates corresponding to the center of the derivative kernel. The sums of the magnitudes of the peaks are placed into a "Magnitude Map" for all pixel coordinates.

The algorithm is not limited to N=2 vectors. Any number of vectors at any angle could be used, with the only limit being processing speed. Using N=6 vectors was found to give improved results relative to N=2.

The shearogram image 41 is analyzed to detect pixels that have a number of peaks within the range expected for a butterfly pattern (derivthresh=6 as default). Pixels below the threshold are set to zero. Bright pixels, caused by reflections off surface objects such as rocks and plants, are also masked out of the Derivative Map by multiplying by a mask image. The mask image is made by locating pixels in the original interferometer image that have higher intensity than the maskval parameter and setting pixels at those coordinates to zero in a binary image.

The detection routine uses the Derivative Map (FIG. 5) to locate anomalous groups of pixels. The filtered pixels of the Derivative Map are "clustered" by combining adjacent pixels within a group-radius distance (grprad) distance of 50 pixels/scalefactor into clusters of pixels with measurements of the cluster size, mean magnitude and centroid pixel location. The centroid of the cluster is used to identify the position of a detected anomaly. In order to be counted as detections, clusters need to pass a size threshold (minpix and maxpix) and distance threshold, where the cluster pixels must be at least a distance of one-half of the derivative kernel size from pixels that are masked out. A small fraction of pixels in a cluster may fall within masked areas, determined by the maskfraction value. Clusters that meet these requirements are counted as detections of the derivative peaks algorithms and detection metadata is added to a detection list structure. This detection list is the primary output data structure for the entire system.

A sample result from automated target detection is shown in FIG. 5, with the centroid coordinates of two clusters displayed as a plus sign within a small circle. This type of visualization can be used to direct a human operator's attention to anomalies. Alternatively, the detection list with the location of anomalies could be used to directly control a machine or robot capable of unearthing or disabling the buried object.

Further discussion the derivative peaks algorithm may be found in U.S. Pat. No. 9,671,521, which is incorporated by reference as if fully rewritten herein.

Figure 6:
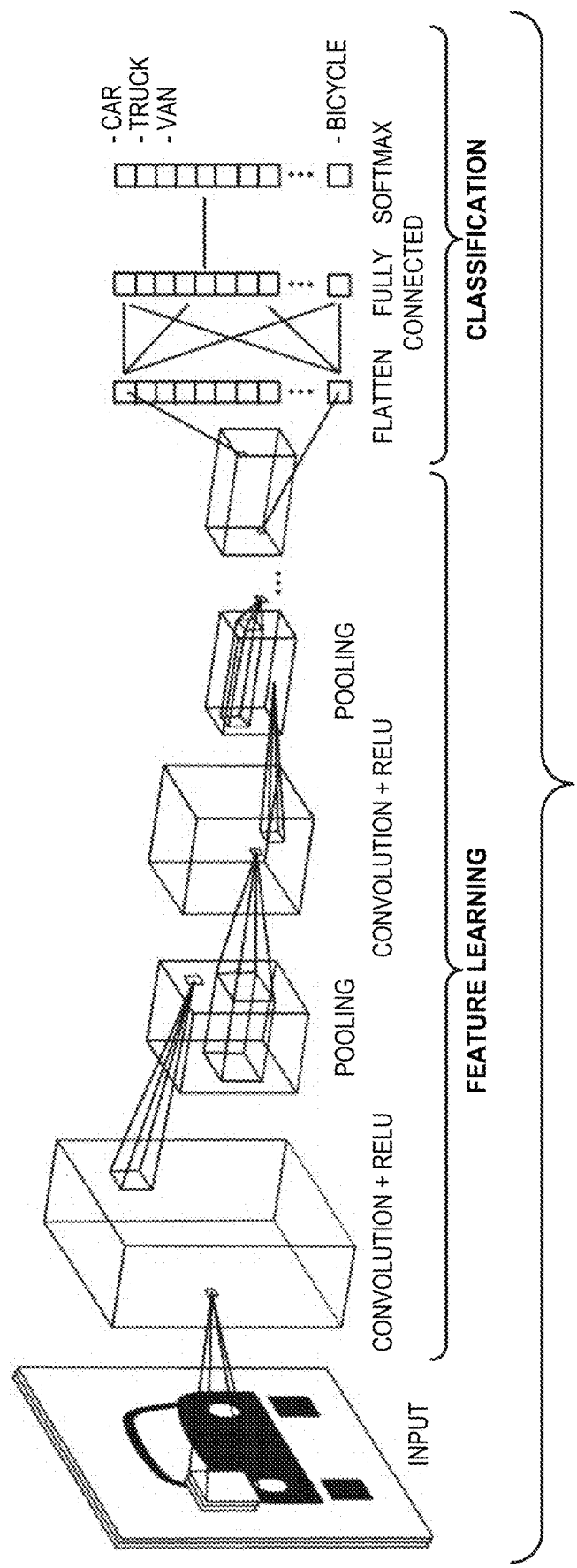
FIG. 6 is a diagrammatic architecture of a conventional prior art CNN in one example.

FIG. 6 diagrammatically depicts a CNN (CNN). Embodiments of CNN training are implemented to provide a progressive training technique, as well as a target classification function, for CNNs. A CNN is a machine learning computer algorithm implemented with multiple layers that run back propagation algorithms on data to learn features and train parameters of the network. One exemplary feature of CNNs that make them applicable to a broad range of classification problems is the principle of transfer learning. A CNN may be initially trained to recognize images of 1,000 standards objects from a database of more than 1 million pre-classified images. Then, to apply the network to a specific problem the final classification layers are replaced with new (un-trained) classification layers configured for the desired classification problem. The modified CNN (in particular the new classification layers) are trained using a comparatively small training image data set matching the new classification problem. In this way, the feature identification and learning capabilities of the CNN are transferred forward and only the final classification layers require re-training.

The multiple layers of the CNN, also referred to as neural layers, classifiers, or feature representations, include classifier layers to classify low-level, mid-level, and high-level features, as well as trainable classifiers in fully-connected layers. The low-level layers initially recognize edges, lines, colors, and/or densities of abstract features, and the mid-level and high-level layers progressively learn to identify object parts formed by the abstract features from the edges, lines, colors, and/or densities. It is this hierarchical structure that makes transfer learning possible; these low and mid-level layers can in fact be pre-trained using standard image databases. A problem specific image data set is then used to train the final fully connected layers for object detection and image classification. Additionally, once the CNN is trained to detect and recognize particular objects and classifications of the particular objects, multiple digital images can be processed through the CNN for object identification and classification.

In embodiments of CNN training, the new untrained problem specific classifier layers are appended to a core pre-trained CNN. The learning rate parameters of the new CNN are then adjusted so that the new untrained classification layers have a high learning rate, while the pre-trained CNN layers are given a low learning rate. The modified CNN is then trained with example data sets matched to the new classification problem; this activity fully trains the new classification layer and only mildly alters the pre-trained core layers.

FIG. 6 illustrates an exemplary CNN in which embodiments of CNN shearography target classification can be accomplished. Generally, a CNN is a machine learning computer algorithm implemented with multiple layers that run back propagation algorithms on data to learn features and train parameters of the network. A CNN can be utilized to rate image aesthetics or any other image attributes used for image classification. In this example system, the data is different data batches of multiple digital image items; that is, the data represents groups of example images corresponding to a certain image attribute or class. In implementations, the different data batches can be event types of different events, and the multiple digital shearography image items of an event type can be groups of digital images each associated with a type of image class, such as a target/threat or a non-target/non-threat. In this case the multiple digital image examples of an image class type may be shearographic images collected by the sensor during field operations, computer simulated shearographic imagery, laboratory collected imagery or any combination thereof.

The CNN may include one or multiple classifier layers, fully-connected layers, and optionally, a layer to implement a ranking algorithm. The CNN can receive an input of the multiple digital image items of the different data batches. The classifier layers of the CNN are trained to recognize the common features in the multiple digital image items of the different data batches, where the data batches represent clips extracted from shearographic images at the locations provided by the derivative peaks algorithm.

The multiple classifier layers of the CNN, also referred to as neural layers, classifiers, or feature representations, include layers to classify low-level, mid-level, and high-level features, as well as trainable classifiers in the fully-connected layers. The low-level layers initially recognize edges, lines, colors, and/or densities of abstract features, and the mid-level and high-level layers progressively learn to identify object parts formed by the abstract features from the edges, lines, colors, and/or densities. As the self-learning and training progresses through the many classifier layers, the CNN can begin to detect objects and scenes, such as for object detection and image classification with the fully-connected layers. The high-level features of the fully-connected layers that discern meaningful labels and clusters of features can be used to discriminate between the different image classes.

While features and concepts of CNN training can be implemented in any number of different devices, systems, networks, environments, and/or configurations, embodiments of CNN training are described in the context of the following example devices, systems, and methods.

Figure 7:
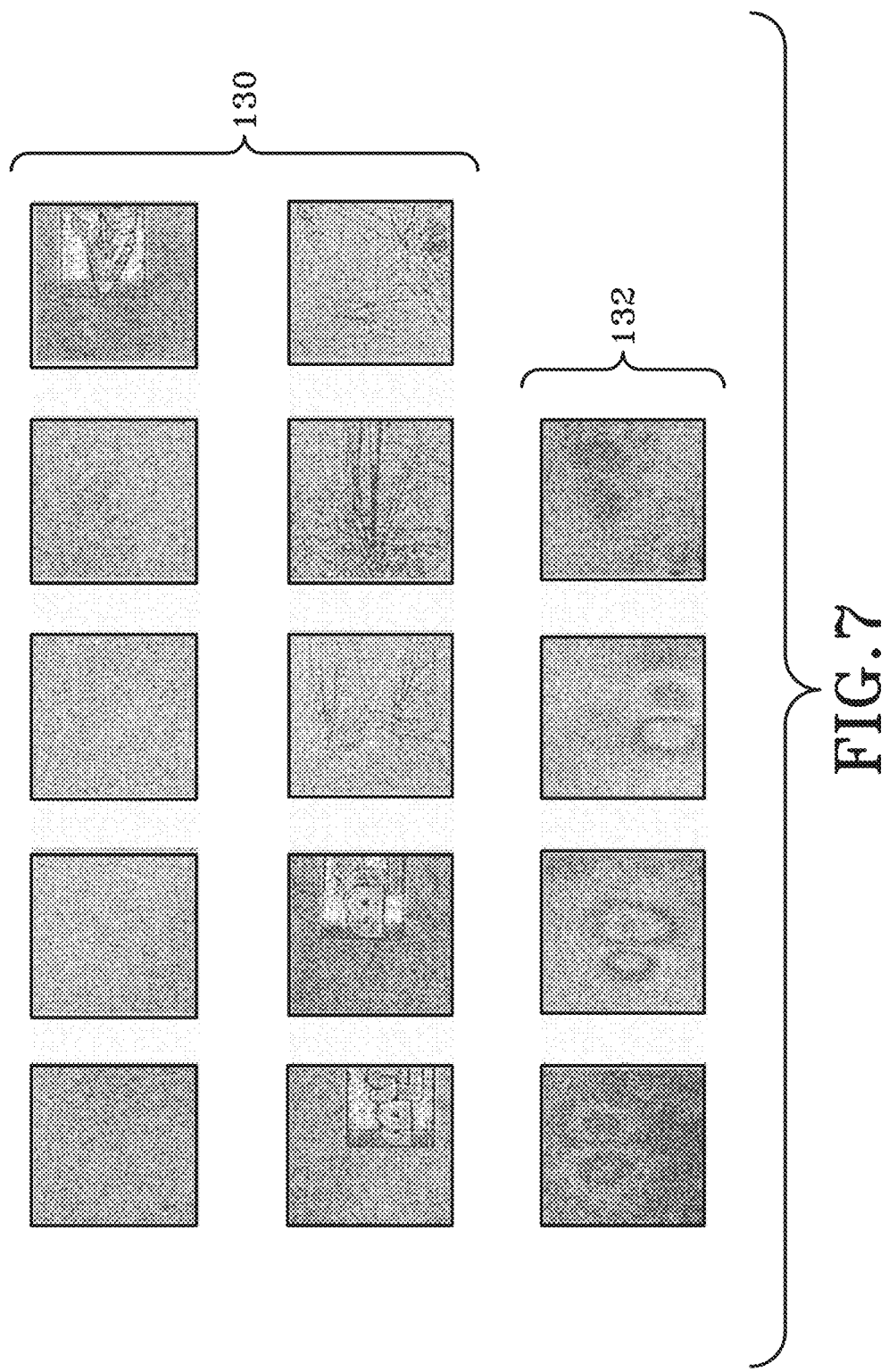
FIG. 7 is a diagrammatic view of a plurality of training images to train the CNN on threats and non-threats.

FIG. 7 depicts a sample training data set used to train a four-class CNN classifier constructed using an inception V3 network. FIG. 7 depicts fourteen extracted clips from a training session of the CNN 112. The first ten clips represent training images of non-threat classes corresponding to (i) empty clutter, (ii) panels, and (iii) vegetation. Collectively, the non-threat training clips are shown as the extracted clips identified by bracket 130. Extracted clips of training targets are shown by bracket 132. The 4 extracted clips have varying shapes representing the range of features the CNN must be trained to classify as a buried target in a shearographic image. In one particular example, the targets represented by the extracted clips depicted by bracket 132 correspond to a subsurface or subterranean explosive device.

Figure 8:
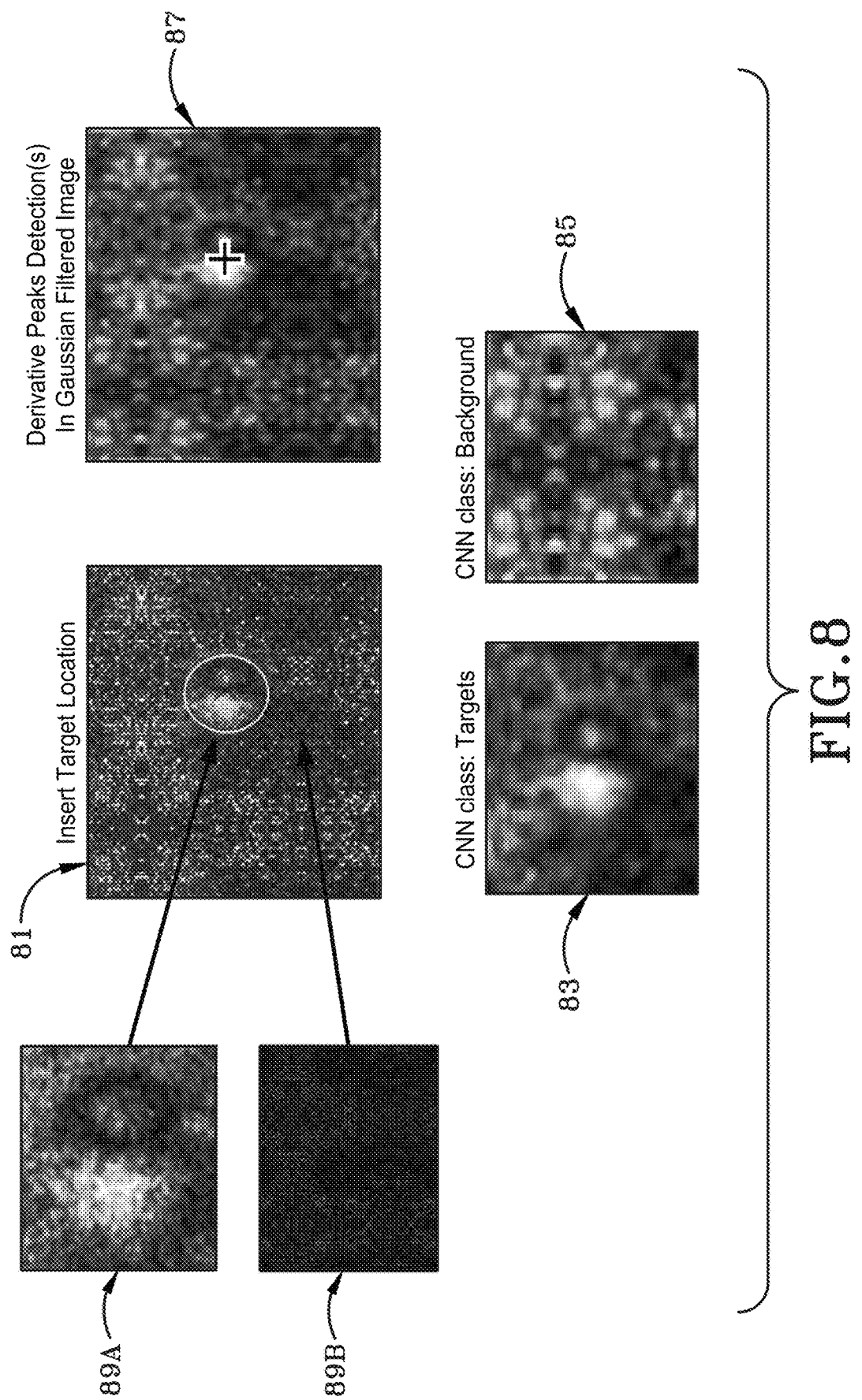
FIG. 8 is a pictograph test result depicting extracted clips correctly identifying a target and background clutter or a non-threat.

FIG. 8 depicts an exemplary test with a random target insertion 89A, in a random background field 89B generating resultant image 81. When the derivative peak logic is applied to image 81, two possible targets, or detection hypotheses, are identified. Image clips of the two detection hypotheses in image 87 are extracted and sent to the trained CNN for classification. The CNN correctly identifies the first clip 83 as a target and the second clip 85 as background clutter. Thus, the example of FIG. 8 illustrates that with proper training of the CNN 112, extracted clips 83, 85 detected by the derivative peak algorithm can be correctly classified as to whether to process as a target (i.e. threat) or as a non-target (i.e. background, clutter, or non-threat).

Figure 9:
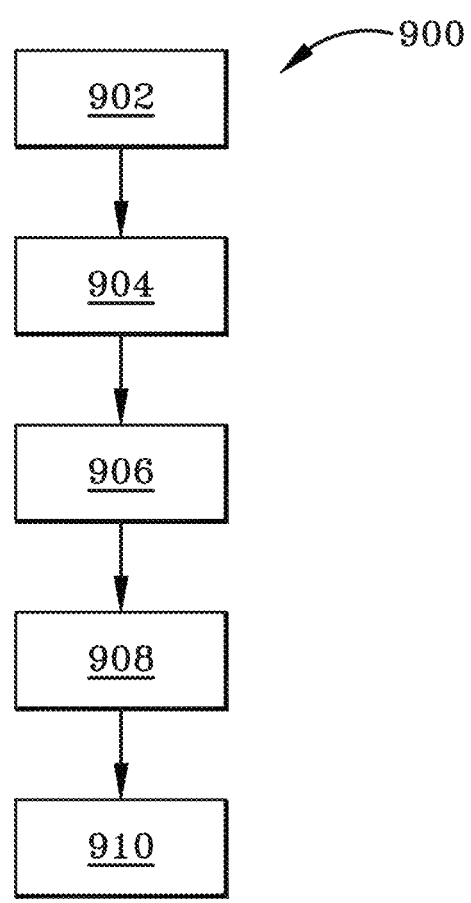
FIG. 9 is a flowchart in accordance with a method of the present disclosure for classifying objects that were detected in a shearographic image via the derivative peak value with a convolutional neuro network according to one embodiment.

FIG. 9 depicts a flowchart in accordance with an exemplary method of the present disclosure generally at 900. Method 900 includes stimulating a surface, which is shown generally at 902. Method 900 further includes sensing the surface during stimulation, which is shown generally at 904. Method 900 further includes generating a shearographic image based on data sensed during stimulation of the surface, which is shown generally at 906. Method 900 further includes detecting an image features via a derivative peak value analysis, which may correspond to an object below the surface at a location in the shearographic image, which is shown generally at 908. And method 900 includes classifying the object with the CNN 112 at the location in the shearographic image identified via a derivative peak value analysis, which is shown generally at 910.

Method 900 may further provide extracting a clip from the shearographic image encompassing the derivative peak value; and providing the clip that has been extracted to the CNN. Additionally method 900 may provide that the extracted clip includes features of the object that is to be classified by the CNN. In method 900 it is possible for the remaining portions of the shearography image after the extracted clip has been extracted to contain background matter that is not classified by the CNN. Method 900 may further provide lowering a threshold value associated with the derivative peak values to facilitate detection of targets for which only a partial image clip is available.

In another particular embodiment, method 900 provides executing a detection call of from the CNN to classify one of a target and clutter of the object identified by the derivative peak value and based on previous training of the CNN. In another particular embodiment, method 900 provides constructing four-class classifier in the CNN from an inception network. In another particular embodiment, method 900 provides eliminating any uniform background (non-anomalous) classes in the CNN. In another particular embodiment, method 900 provides constructing classifier with two or more classes in the CNN from any pre-trained image identification CNN network. In another particular embodiment, method 900 provides Gaussian filtering the shearographic image; and classifying object features based on derivative peaks of values in the shearographic image after Gaussian filtering.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system for identifying targets, comprising:
   an image generator to generate a shearographic image based on at least two images of a target surface, wherein at least one of the images includes stimulation of the target surface;
   logic to determine a derivative peak value of the shearographic image to detect the presence of the object below the target surface; and
   a Convolutional Neural Network (CNN) to classify the object below the target surface at a location corresponding to the derivative peak value.

2. The system for identifying targets of claim 1, further comprising a device to stimulate the target surface.

3. The system for identifying targets of claim 1, further comprising a sensor to sense the target surface.

4. The system for identifying targets of claim 1, wherein the images are specklegrams.

5. The shearography system of claim 1, further comprising:
   an extracted clip from the shearographic image encompassing the derivative peak value, wherein the extracted clip is provided to the CNN.

6. The shearography system of claim 5, wherein the extracted clip includes one or more features of the object that is to be classified by the CNN.

7. The shearography system of claim 1, further comprising:
   a detection call from the CNN classifying one of: (i) a target and (ii) clutter of the object that is identified by the derivative peak value and based on previous training and machine learning of the CNN.

8. The shearography system of claim 1, further comprising:
   a four-class classifier in the CNN constructed from an inception network.

9. The shearography system of claim 1, further comprising a two or more class classifier in the CNN constructed from any pre-trained image identification CNN network.

10. The shearography system of claim 1, further comprising:
    classes in the CNN, wherein there are no uniform background (non-anomalous) classes.

11. The shearography system of claim 1, further comprising:
    object features identified by derivative peaks of values in the shearographic image, wherein the shearographic image is Gaussian filtered.

12. A method comprising:
    stimulating a surface;
    sensing the surface during stimulation;
    generating a shearographic image based on data sensed during stimulation of the surface;
    detecting an object below the surface at a location in the shearographic image via a derivative peak process; and
    classifying the object with a convolutional neural network (CNN) at the location in the shearographic image corresponding to the derivative peak value.

13. The method of claim 12, further comprising:
    extracting a clip from the shearographic image encompassing the derivative peak value; and
    providing the clip that has been extracted to the CNN.

14. The method of claim 13, wherein the extracted clip includes features of the object that is to be classified by the CNN.

15. The method of claim 14, wherein remaining portions of the shearography image after the extracted clip has been extracted contains background matter that is not classified by the CNN.

16. The method of claim 14, further comprising:
    lowering a threshold value associated with the derivative peak process in order to detect weak or partial images of the object beneath the target surface.

17. The method of claim 12, further comprising:
    executing a detection call of from the CNN to classify one of a target and clutter of the object identified by the derivative peak value and based on previous training of the CNN.

18. The method of claim 12, further comprising:
    constructing four-class classifier in the CNN from an inception network; and
    eliminating any uniform background classes in the CNN.

19. The method of claim 12, further comprising:
    gaussian filtering the shearographic image; and
    classifying object features based on derivative peaks of values in the shearographic image after Gaussian filtering.

20. A computer program product including one or more non-transitory machine-readable mediums encoded with instructions that when executed by one or more processors cause a process to be carried out for detection and classification of a shearographic image, the process comprising:
    providing at least two images of a target surface, wherein at least one of the images includes stimulation of the target surface;
    generating the shearographic image based on the images;
    detecting an object below the target surface from the shearographic image via a derivative peak process; and
    classifying the object with a convolutional neural network (CNN) at a location in the shearographic image corresponding to the derivative peak value.

* * * * *